United States Patent [19]

Greer

[11] 4,121,862
[45] Oct. 24, 1978

[54] PIPE CONNECTION
[75] Inventor: James B. Greer, Houston, Tex.
[73] Assignee: Exxon Production Research Company, Houston, Tex.
[21] Appl. No.: 785,158
[22] Filed: Apr. 6, 1977
[51] Int. Cl.² ............................................. F16L 15/00
[52] U.S. Cl. ................................. 285/333; 403/343
[58] Field of Search ............... 285/333, 334, 355, 390; 85/46, 1 P; 403/343

[56] References Cited

U.S. PATENT DOCUMENTS

| | | | |
|---|---|---|---|
| 1,394,791 | 10/1921 | Runyan | 285/333 |
| 2,062,407 | 12/1936 | Eaton | 285/334 |
| 2,267,923 | 12/1941 | Johnson | 285/334 |
| 2,793,884 | 5/1957 | Jungblut | 285/333 X |
| 2,909,380 | 10/1959 | Hoye et al. | 285/333 |
| 3,079,181 | 2/1963 | Van Der Wissel | 285/333 |
| 3,870,351 | 3/1975 | Matsuki | 285/334 |

Primary Examiner—Price C. Faw, Jr.
Assistant Examiner—Conrad L. Berman
Attorney, Agent, or Firm—John S. Schneider

[57] ABSTRACT

A high pressure, antigalling, thread interference pipe connection for use with well pipe includes pin and box members, the thread pitch lines of which are curved at the entrance of the box member and at the nose of the pin member so that sharp corners on the threads at the end of one member do not engage the threads of the other mating member and, also, so that pressure due to thread interference is built up in a smooth fashion over several threads rather than as a sharp pressure spike created by the first threads of one member engaging the threads of the other mating member. In addition, the pitch diameters of the threads of the pin and box members are selected so that makeup of the pin and box members occurs only on full height threads.

12 Claims, 5 Drawing Figures

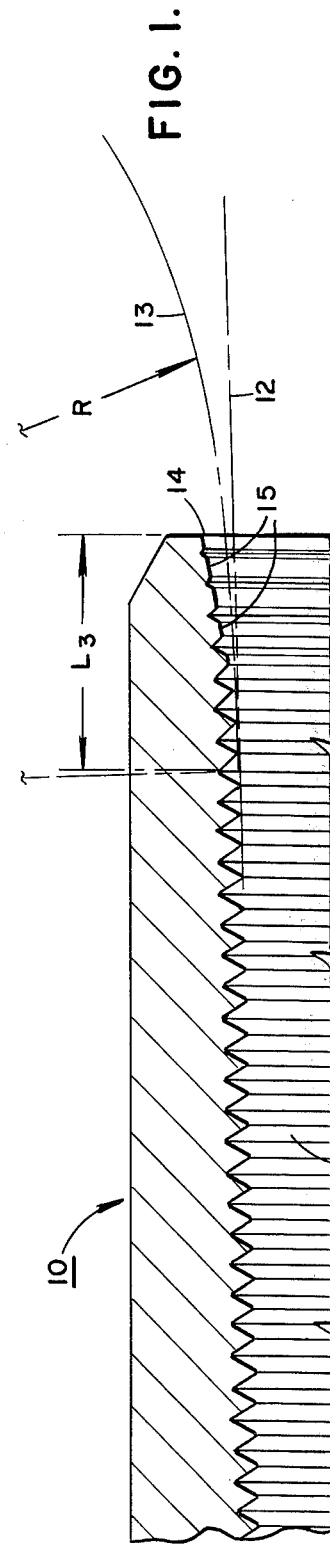
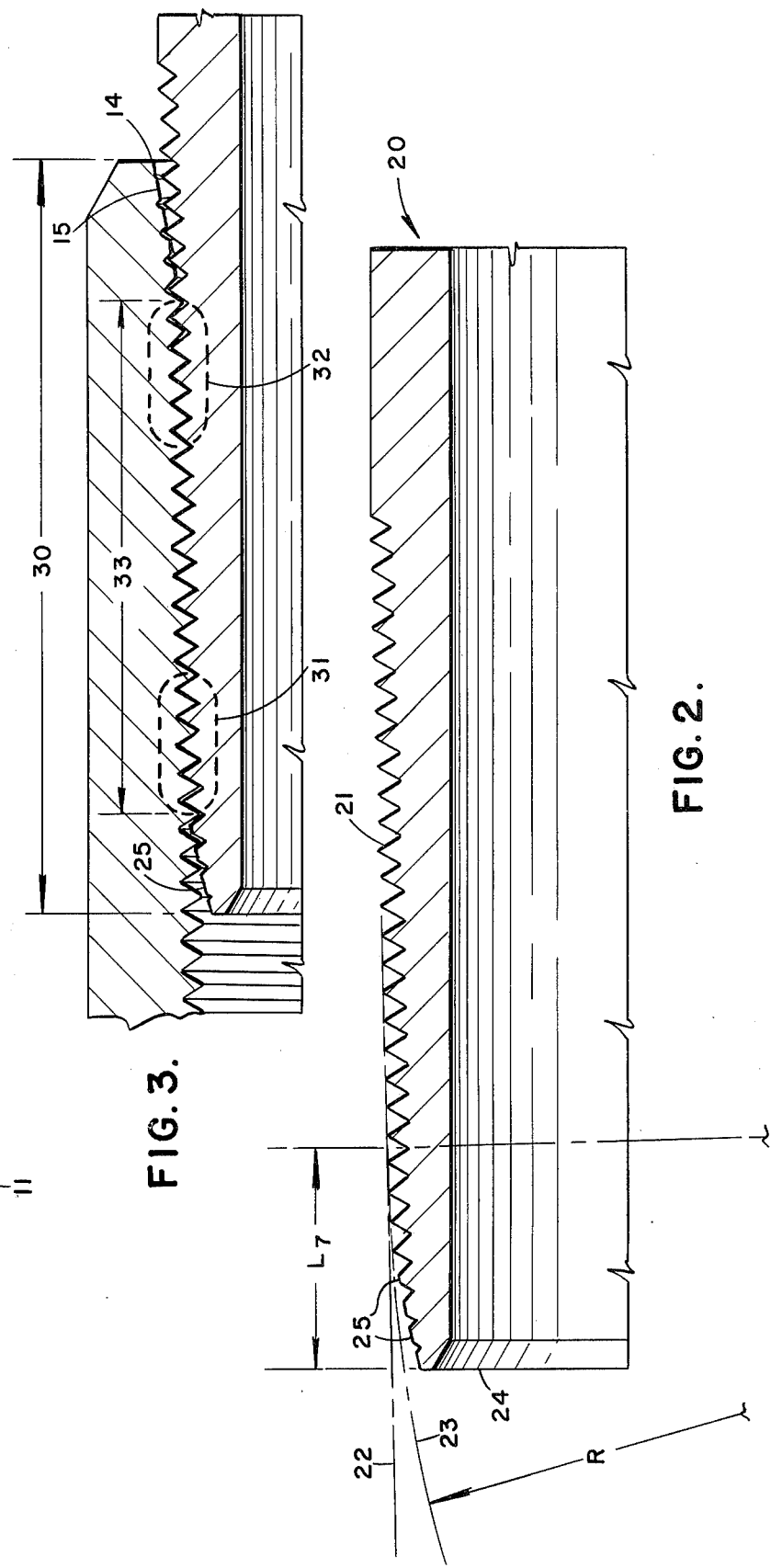

PIPE CONNECTION

BACKGROUND OF THE INVENTION

The present invention concerns threaded connections for tubular members or pipe, such as pipe used in the production of gas and/or oil. More particularly, the present invention concerns threaded connections for pipe used in high pressure environments.

The thread interference connection of the invention obtains a seal over substantially the full length of the threaded surface as compared to a seal obtained over a very short length of the threads as in some other type connections.

In operations connected with the production of oil/gas from underground reservoirs it is necessary to use sections of pipe which are connected together in a fluid tight relation to form a conduit for the production fluids. This pipe is usually under pressure and tension or compression which imposes considerable loads on the connection between the pipe sections. Such loads make difficult the prevention of leakage of production fluids through the connections. The present invention is a threaded connection designed to provide a fluid-tight connection that will not leak when subjected to high fluid pressures and tension or compression.

SUMMARY OF THE INVENTION

In accordance with the teachings of the invention the thread pitch lines at the entrance of a pipe box member and the nose of a pipe pin member are curved to prevent the sharp corners on the first (lead or initial) threads of one member from engaging the threads of the other mating member and to build up pressure caused by thread interference in a smooth fashion over several threads rather than as a sharp pressure spike created by the first threads of one member engaging the threads of the mating member. Also, the pitch diameters of the threads of the pin and box members are selected so that the makeup of the pin and box members occurs only on full height threads. To assist in field handling without harmful thread damage, the first threads on the ends of the pin and box members may be chamfered at a suitable angle and the sharp corners on the incomplete threads created by the chamfer then rounded.

BRIEF DESCRIPTION OF THE DRAWINGS

FIGS. 1 and 4 illustrate the threaded end of a coupling (tubing box-connection) in accordance with the invention;

FIGS. 2 and 5 illustrate the threaded end of another coupling (tubing pin-connection) in accordance with the invention; and FIG. 3 illustrates the coupling members of FIGS. 1 and 3 made up or connected together.

DESCRIPTION OF THE PREFERRED EMBODIMENTS

Figure 4:
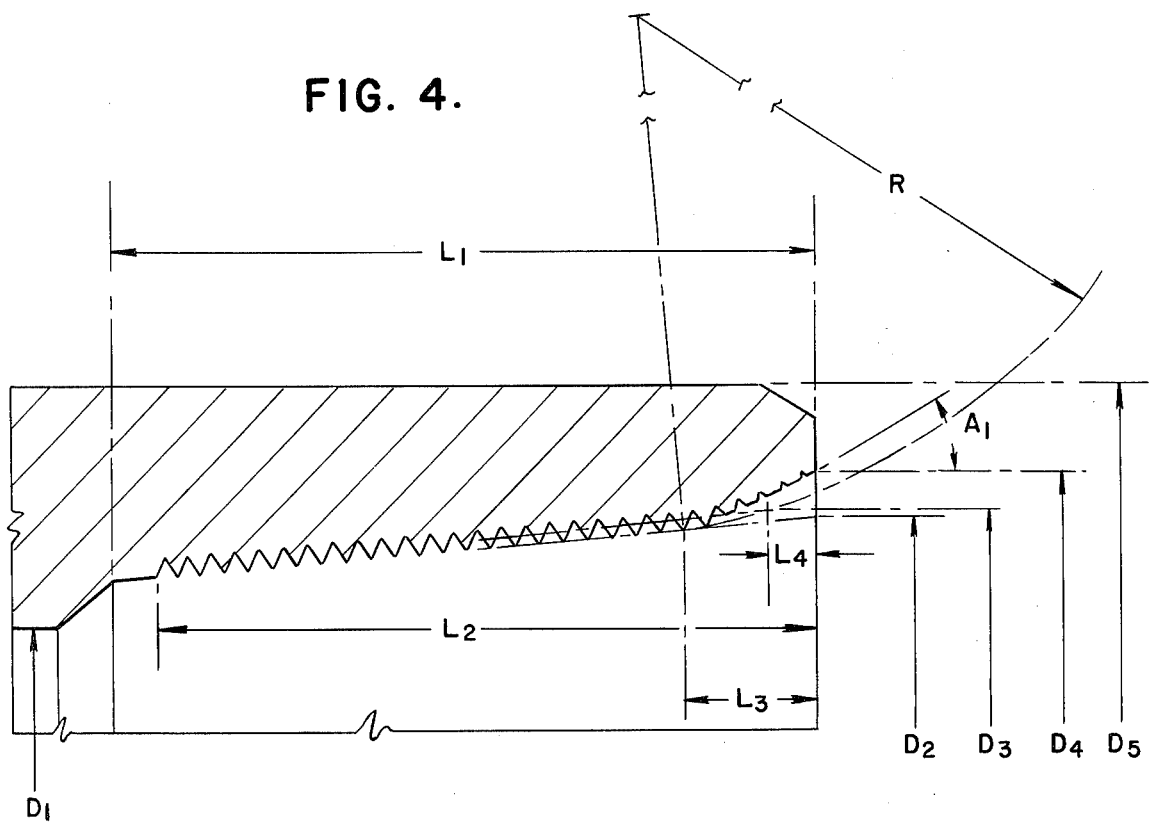

Referring to FIG. 1 there is shown a cylindrical box member 10 having threads 11, the pitch diameter of which reduces, as indicated by the tapered line 12, in a direction from right to left. The pitch line of the threads of the box member is curved, as indicated by line 13. The threads at the entrance 14 of box member 10 are chamfered, as indicated at 15, with the sharp corners on the incomplete threads rounded so as to remove burrs.

A cylindrical pin member 20 is designed similarly. As shown in FIG. 2, threads 21 of pin member 20 have a pitch diameter which reduces, as indicated by the tapered line 22 in a direction from right to left. The threads of pin member 20 are curved, as indicated by pitch line 23. The threads at the nose or leading edge 24 of the pin member are also chamfered, as indicated at 25, with the sharp corners on the incomplete threads rounded so as to remove burrs.

As seen in FIG. 3, the pitch diameter of box member 10 and the pitch diameter of pin member 20 are chosen with respect to each other so that full height threads are maintained over the length, indicated at 33, of the madeup intersecting threads. Otherwise, sharp cornered incomplete threads might be created by the intersection of the pin member's outside diameter and the thread profile.

FIG. 3 shows the madeup interference connection between box member 10 and pin member 20. The sharp corners formed on the first chamfered threads of the pin and box members have been eliminated from contact by curving the pitch lines 13 and 23, respectively, of the box and pin members (and rounding the corners of the chamfered threads) so that the forces developed on the threads of the pin and box members are lessened or negated to reduce thereby the wear and galling tendency of threaded connections. The curved pitch lines lower the contact forces on the first full height threads, indicated by dotted lines 31 and 32, between the intersecting threaded conical (tapered) shapes of the pin and box members. The curved pitch lines of the threads of the pin and box members gradually reduce the interference of the two intersecting conical shapes below that required for contact and provide faired, increasing taper sections, 31 and 32, to bring up pressure on the interfering threads in a gradual manner. The curving of each pitch line is on a circular profile, but could be on any suitable profile which would bring up pressure on the first threads in a gradual manner.

Somewhat higher contact forces are developed at the leading edges of the pin and box members. Although the curvatures of the pitch lines results in essentially no wear, the variation of pressure over the length of the threads can be noted by the polish given to the coating on the pin or box member threads. Such polishing indicates that the highest pressure still occurs at the end of the box and pin members near the areas of pitch line curvatures, as indicates by areas 31 and 32. Such a profile is significant since these are the desirable locations for maximum interference pressure to seal both external and internal pressures.

Also shown on FIGS. 1 and 2 are distances $L_3$ and $L_7$ which designate the lengths of the threads cut on the curves 13 and 23, respectively. In FIG. 3 numeral 30 represents the distance the pin member 20 extends into box member 10 when those members are fully madeup. The two areas 31 and 32 show the primary sealing points (and highest contact pressure points) at the onset of pitch curvature on the pin and box members 20 and 10, respectively. Numeral 33 indicates the length of the engagement of the full height threads of the madeup connection.

Figure 5:
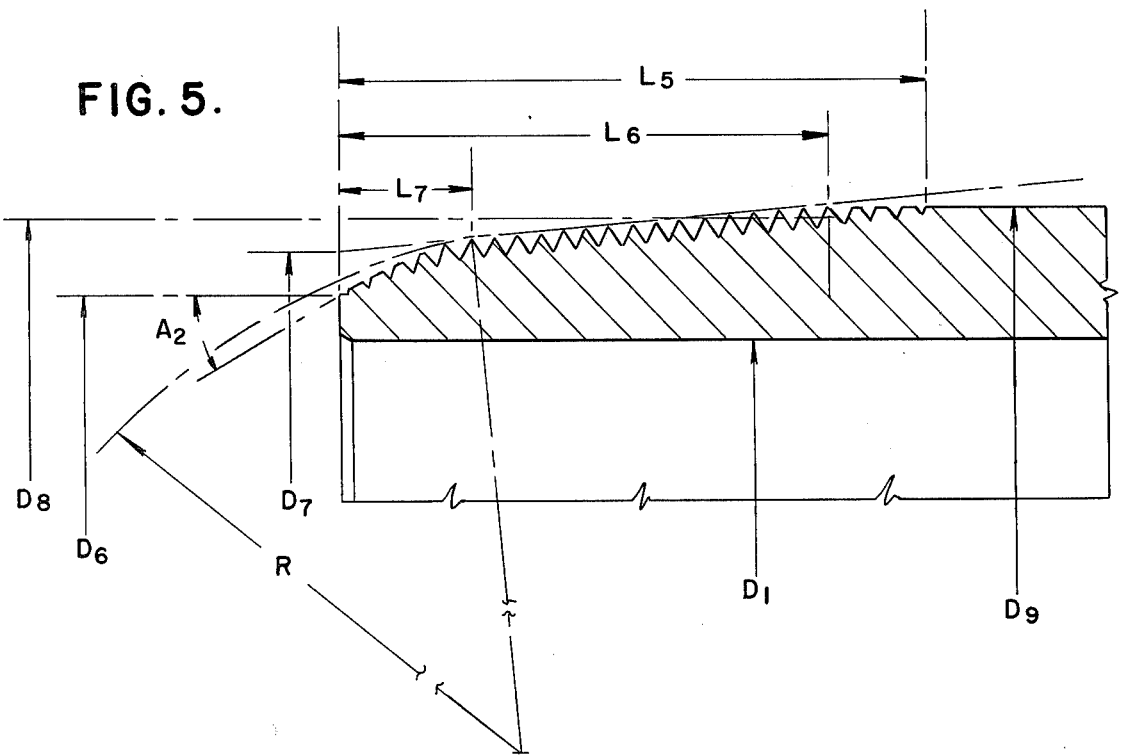

The dimensions of a typical 3½ inch tubing box connection and 3½ inch tubing pin connection are illustrated in FIGS. 4 and 5. The letters shown on those drawings designate the following lengths and distances:

$L_1$ = 3.75 inches (length of bore of box)
$L_2$ = 3.25 inches (length of box threads)
$L_3$ = 0.800 inches (arc length of 16.710 inches radius with threads cut around the radius on box)

$L_4$ = 0.134 inches (distance from box end to pitch diameter location)

$L_5$ = 3.667 inches (length of pin threads)

$L_6$ = 2.167 inches (distance from pin end to pitch diameter location)

$L_7$ = 0.800 inches (arc length of 16.710 inches radius with threads cut around the radius on pin)

$D_1$ = 3 inches (inside diameter of box and pin)

$D_2$ = 3.334 inches (diameter at start of taper at face of box)

$D_3$ = 3.3809 inches (pitch diameter of box at hand tight plane)

$D_4$ = 3.531 inches (inside diameter at end of chamfer of box)

$D_5$ = 4 inches (outside diameter of box)

$D_6$ = 3.260 inches (outside diameter at end of chamfer of pin)

$D_7$ = 3.301 inches (diameter at the start of taper at face of pin)

$D_8$ = 3.3809 inches (pitch diameter of pin at hand tight plane)

$D_9$ = 3.5 inches (outside diameter of pin)

The thread form for the above connection is an American Petroleum Institute (API) 10 thread per inch, ¾ inch per foot taper, round thread form; see API Std. 5B, 9th Edition, March 1974 — API Specification for Threading, Gaging, and Thread Inspection of Casing, Tubing, and Line Pipe Threads.

In tests conducted to measure the wear or galling resistance of the connection, a pin, formed in accordance with the invention, was repeatedly made up and broken out of a coupling (box), also formed in accordance with the invention, at constant makeup torque. Both visual examination and analysis of the data from those tests, shown in the table below, indicated no significant deterioration due to wear. Such deterioration would be evidenced by a large decrease in incremental turns after makeup-breakout cycling between the 250 and 1000 foot pounds torque values (column 3). It is seen that following ten make-breaks at 1000 foot pounds torque (cycles 1 through 10 - column 2) the torque was doubled to 2000 foot pounds (cycle 11 - column 4) with no sign of damage upon break-out and with approximately the same incremental increase in turns (1.5 turns - column 5) from 1000 to 2000 foot pounds as previously observed from 250 to 1000 pounds (1.5 average turns - column 3) indicating an exceptional degree of freedom from wear and galling. A total of 6.5 turns (cycle 11 - column 4) from hand tight to 2000 foot pounds were recorded which is approximately three times the recommended turns for otherwise similar oil field tubing connections. If there is no galling or seizing the torque required to break-out the connection (cycles 1 to 11 - column 6) is approximately equal to the makeup torque (cycles 1 to 10 - column 2 and cycle 11 - column 4). Small differences between makeup and break-out torque as seen in the table are usually due to effects of thermal expansion from heat generated in the makeup process or changes in the properties of the thread lubricant. Significantly, the break-out torque after making up to 2000 foot pounds was 2000 foot pounds, again indicating no damage to the connection.

| Cycle | Turns at Torque, ft-lb, for One End on Connection | | | | | (6) Break-out Torque | (7) Condition |
| --- | --- | --- | --- | --- | --- | --- | --- |
| | (1) H.T.* to 250 | (2) H.T. to 1000 | (3) 250 to 1000 | (4) H.T. to 2000 | (5) 1000 to 2000 | | |
| #1 | 3.8 | 5.2 | 1.4 | | | 900 | No damage |
| #2 | 3.7 | 5.6 | 1.9 | | | 1000 | " |
| #3 | 3.6 | 4.8 | 1.2 | | | 1000 | " |
| #4 | 3.5 | 5.2 | 1.7 | | | 900 | " |
| #5 | 3.6 | 5.3 | 1.7 | | | 1000 | " |
| #6 | 4.2 | 5.7 | 1.5 | | | 1000 | " |
| #7 | 4 | 5.6 | 1.6 | | | 1250 | " |
| #8 | 3.2 | 4.7 | 1.5 | | | 1100 | " |
| #9 | 4 | 5.4 | 1.4 | | | 1000 | " |
| #10 | 3.5 | 5 | 1.5 | | | 900 | " |
| #11 | 3.7 | 5 | 1.3 | 6.5 | 1.5 | 2000 | " |
| Average | 3.7 | 5.2 | 1.5 | | | | |

*Hand Tight

The invention is applicable to thread forms other than the particular thread form illustrated and described herein. Also, either the pin or box member, made according to the invention, may be used with a conventional threaded box or pin member, respectively. Further, the box member might be a coupling or another pipe; that is, the connection may be a coupled connection or an integral connection. These and other changes and modifications in the illustrative embodiments of the invention shown and described herein may be made without departing from the scope of the invention as defined in the appended claims.

What is claimed is:

1. A tubular connection comprising
    a threaded cylindrical pin member having a curved thread pitch line;
    a threaded cylindrical box member having a curved thread pitch line, the threads on said pin and box members being capable of mating with each other;
    the curvatures of said pitch lines of said pin and box members being selected such that lead threads on said pin and box members do not engage when said pin and box members are made up and the pressure due to thread interference in the madeup connection is built up in a smooth fashion over several threads; and
    the pitch diameters of said threads of said pin and box members being tapered, said pitch diameters being selected such that makeup of the threads of said pin and box members occurs only on full height threads.

2. A tubular connection as recited in claim 1 in which one or more of said lead threads on said pin and box members are chamfered and the sharp corners of the chamfered threads rounded.

3. A tubular connection as recited in claim 2 in which when said pin and box meembers are made up contact pressure in the threaded connection is varied so that primary sealing is achieved at the point of onset of pitch curvature of the thread pitch lines of the pin and box members.

4. A tubular connection as recited in claim 3 in which said box member is a coupling.

5. Apparatus, including a first threaded tubular member for threadedly mating with a second threaded tubular member, comprising:
a curved thread pitch line formed on said first tubular member, the curvature of said pitch line of said first tubular being selected such that lead threads on said first tubular member do not engage threads on said second tubular member when said tubular members are made up and the pressure due to thread interference in the madeup connection is built up in a smooth fashion over several threads; and
the pitch diameter of said threads of said first tubular member being tapered, said pitch diameter being selected such that makeup of the threads of said first tubular member and the threads of said second tubular member occurs only on full height threads.

6. Apparatus as recited in claim 5 in which one or more of said lead threads on said first tubular member are chamfered and the sharp corners of the chamfered threads rounded.

7. Apparatus as recited in claim 6 in which when said tubular members are made up contact pressure in the threaded connection is varied so that primary sealing is achieved at the point of onset of pitch curvature of the thread pitch line of said first tubular member.

8. Apparatus as recited in claim 7 in which said first tubular member comprises a pin member.

9. Apparatus as recited in claim 7 in which said first tubular member comprises a box member.

10. Apparatus as recited in claim 9 in which said box member is a coupling.

11. A tubular connection comprising:
a threaded cylindrical pin member having a curved constant thread pitch line;
a threaded cylindrical box member having a curved constant thread pitch line, the threads on said pin and box members being capable of mating with each other; and
the curvatures of said pitch lines of said pin and box members being substantially the same and selected such that lead threads on said pin and box members do not engage when said pin and box members are made up and the pressure due to thread interference in the madeup connection is built up in a smooth fashion over several threads.

12. Apparatus, including a first threaded tubular member for threadedly mating with a second threaded tubular member, comprising:
a curved constant thread pitch line formed on said first tubular member, the curvature of said pitch line of said first tubular member being substantially the same as the curvature of the pitch line of said second tubular member and being selected such that lead threads on said first tubular member do not engage threads on said second tubular member when said tubular members are made up and the pressure due to thread interference in the madeup connection is built up in a smooth fashion over several threads.

* * * * *